United States Patent
Yang et al.

(10) Patent No.: US 12,216,920 B2
(45) Date of Patent: Feb. 4, 2025

(54) SSD AUXILIARY BATTERY POWER FOR HANDLING UNGRACEFUL SHUTDOWN WITH HOST

(71) Applicant: Western Digital Technologies, Inc., San Jose, CA (US)

(72) Inventors: Nian Yang, Mountain View, CA (US); Judah Gamliel Hahn, Ofra (IL)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 18/542,437

(22) Filed: Dec. 15, 2023

(65) Prior Publication Data

US 2024/0118814 A1    Apr. 11, 2024

Related U.S. Application Data

(63) Continuation of application No. 17/646,095, filed on Dec. 27, 2021, now Pat. No. 11,934,664.

(51) Int. Cl.
*G06F 3/06* (2006.01)
*H02J 7/00* (2006.01)

(52) U.S. Cl.
CPC .......... *G06F 3/0619* (2013.01); *G06F 3/0658* (2013.01); *G06F 3/0689* (2013.01); *H02J 7/0063* (2013.01)

(58) Field of Classification Search
CPC .... G06F 3/0619; G06F 3/0658; G06F 3/0689; H02J 7/0063
See application file for complete search history.

(56) References Cited

U.S. PATENT DOCUMENTS

| | | | |
|---|---|---|---|
| 7,984,316 B2 | 7/2011 | Kaler | |
| 8,607,036 B2 | 12/2013 | More et al. | |
| 9,652,377 B2 | 5/2017 | Kimura et al. | |
| 10,139,884 B2 | 11/2018 | Pardoe | |
| 10,283,170 B2 | 5/2019 | Tuma | |
| 10,782,762 B2 | 9/2020 | Ryu | |
| 10,789,130 B1 | 9/2020 | Horspool et al. | |
| 2005/0182991 A1 | 8/2005 | Kawakubo | |
| 2017/0185335 A1 | 6/2017 | Pardoe | |
| 2017/0315889 A1 | 11/2017 | Delaney et al. | |
| 2018/0032390 A1 | 2/2018 | Rahmanian et al. | |

(Continued)

FOREIGN PATENT DOCUMENTS

| KR | 20110117026 A | 10/2011 |
|---|---|---|
| KR | 20120012950 A | 2/2012 |

*Primary Examiner* — Jason W Blust
(74) *Attorney, Agent, or Firm* — ARENTFOX SCHIFF LLP

(57) ABSTRACT

Aspects of a storage device, a host device, and a redundant array of independent disks (RAID) system including multiple storage devices and the host device are provided that provide power control and power loss handling. The host device and the storage devices in the RAID system may each include at least a memory, a controller coupled to the memory, and a power management circuit coupled to the memory and the controller. A storage device controller may receive rationed power from the host device or a RAID controller in the host device in response to a message from that storage device indicating a detected loss in supplied power. An amount of the rationed power is based on a program data rate of the storage device or a size of data from the host device or the RAID controller to be written to the memory. Thus, UGSDs may be detected and addressed.

20 Claims, 12 Drawing Sheets

(56) References Cited

U.S. PATENT DOCUMENTS

2018/0267827 A1 9/2018 Kanno
2019/0146572 A1 5/2019 Nakanishi
2020/0409838 A1 12/2020 Park et al.

SSD AUXILIARY BATTERY POWER FOR HANDLING UNGRACEFUL SHUTDOWN WITH HOST

CROSS REFERENCE TO RELATED APPLICATION(S)

This application is a continuation of U.S. application Ser. No. 17/646,095, entitled "SSD Auxiliary Battery Power For Handling Ungraceful Shutdown With Host" and filed on Dec. 27, 2021, the disclosure of which is expressly incorporated by reference herein in its entirety.

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

Flash storage devices may perform multiple operations, such as reading, writing, or erasing data in blocks of the non-volatile memory. Many of these operations may take orders of microseconds or even milliseconds to complete; for example, a typical write operation may take 10 ms to complete. With such long times, it is possible for a flash storage device to experience a power loss while an operation is still ongoing. For example, the flash storage device may be abruptly disconnected from a host device, or in some cases, a host-level thermal shock, power plant failure, or hacker attack may stop the supply of power from the host device. This power loss may lead to an ungraceful shutdown (UGSD), resulting in an uncertain state of the flash storage device in regard to its ongoing operation. For instance, if a UGSD occurs while a write operation to a block is ongoing, the write operation state may be uncertain since at the time power was lost host data may have been undergoing transfer or may only be partially programmed in the non-volatile memory. As a result, once power is restored to the flash storage device and an attempt is made to read the block, uncertainty may exist as to whether the data read from the block is valid or whether previous data was lost or not programmed. It would therefore be helpful to design a power-loss protection (PLP) mechanism to address UGSD.

SUMMARY

One aspect of a storage device is disclosed herein. The storage device includes a memory, a controller coupled to the memory, and a power management circuit coupled to the memory and the controller. The power management circuit is configured to detect a loss in power supplied by a redundant array of independent disks (RAID) controller, to cause the controller to send a message to the RAID controller indicating the loss in power, and to receive power from the RAID controller in response to the message. The controller is configured to write data to the memory using the power from the RAID controller.

Another aspect of a storage device is disclosed herein. The storage device includes a memory, a controller coupled to the memory, a power management circuit coupled to the memory and the controller, and a rechargeable battery coupled to the power management circuit. The controller is configured to receive power supplied by a RAID controller, to receive a notification of a loss in the power supplied by the RAID controller to another storage device, and to monitor a charge of the rechargeable battery in response to the notification.

A further aspect of a storage device is disclosed herein. The storage device includes a memory, a controller coupled to the memory, a power management circuit coupled to the memory and the controller, and a rechargeable battery coupled to the power management circuit. The controller is configured to receive power supplied by a RAID controller, to receive a notification of a loss in the power supplied by the RAID controller to another storage device, and to cause the power management circuit to detect a charge of the rechargeable battery in response to the notification. The power management circuit is configured to detect another loss in power supplied by the RAID controller, to cause the controller to send a message to the RAID controller indicating the loss in power, and to receive power from the RAID controller in response to the message.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
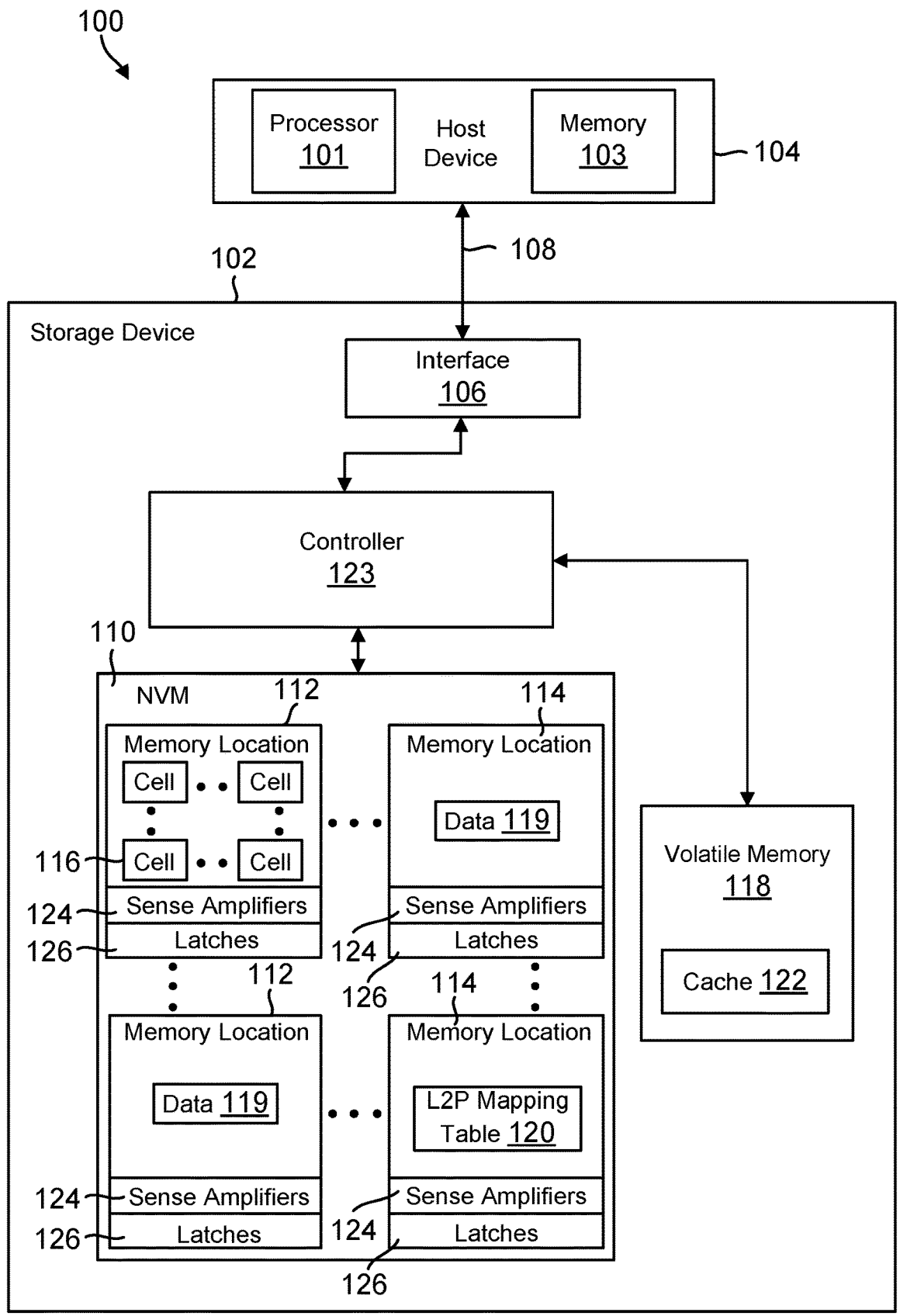
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

A storage device may perform multiple operations, such as reading, writing, and erasing data. As many of these operations (e.g., writing and erasing) may take milliseconds to complete, it is possible for a storage device to experience an UGSD if, for example, the storage device is power disconnected from a host device during an ongoing operation. The UGSD may lead to an uncertain state of data in the storage device in regard to whether host data has been fully programmed, partially programmed, or lost, thus leading to possible read data errors when power is subsequently restored to the flash storage device.

One PLP approach to address UGSD may involve implementing capacitors throughout the storage device in attempt to provide supplemental back-up power in the event of a power loss. However, this approach alone may be inefficient. For example, capacitors tend to occupy a significant footprint of a printed circuit board (PCB) in a storage device and may reduce in lifetime or reliability as the storage device experiences larger numbers of power cycles. Moreover, larger storage devices may require more supplemental power and thus larger size capacitors, which may be cost-prohibitive. Therefore, it would be helpful to provide a more efficient PLP approach to address UGSD.

To this end, the storage device of the present disclosure may include a low-cost rechargeable battery, such as a Lithium-ion (Li-ion) battery, which is sized to supply the storage device with emergency power over a period of time. In the event of a power loss triggering UGSD, a controller of the storage device may be able to handle its ongoing operation(s) using the emergency power from the battery, thereby allowing the storage device to minimize the effects of UGSD and possibly lead to a graceful shutdown (GSD) instead. For instance, if the controller receives a write command from a host device including data to be written to a block, the controller may initially store that data in cache. If a power loss occurs during the time that the controller is writing cached data to a block (e.g., a multi-level cell block), the controller may apply the emergency power from the battery to write the cached data to a backup block (e.g., a single-level cell block), and to store metadata associated with the cached data such as logical-to-physical mapping or file system information. Once power is restored, the controller may read the data from the backup block and write that data to the original block (e.g., the multi-level cell block). Thus, the storage device may more efficiently address UGSD using the emergency power from a battery, which may occupy a smaller footprint of the storage device with a longer lifetime, than the capacitors previously described.

The storage device may include a power management circuit which may detect whether the storage device experiences a loss in power from the host device. The power management circuit may be, for example, a power management integrated circuit (PMIC) or chip, although in other examples, the power management circuit may not necessarily be within an integrated chip. If a power loss is detected, the PMIC may route the emergency power from the battery to the storage device (e.g., 10 seconds of power) for the controller to complete performance of its ongoing operation(s). For instance, the controller may finish programming cached data into non-volatile memory (e.g., into a backup block) as well as store control information or metadata in the non-volatile memory. On the other hand, if no power loss is detected (e.g., the storage device is operating normally), the PMIC may prevent the battery from supplying power to the storage device. For example, the PMIC may connect to the battery via a switch that the PMIC may enable or disable depending on whether power loss is detected or not. Moreover, the controller of the storage device may periodically monitor the battery to check the available charge. For instance, the controller may trigger the PMIC to perform a battery power check daily to make sure the battery remains at full charge capacity in the event of a power loss. If the battery power check determines that the battery is not at full charge capacity (e.g., due to charge leakage or use from previous power loss handling), the PMIC may re-charge the battery to full capacity.

Additionally, in various examples, the storage device may be part of a system of multiple storage devices connected together as a redundant array of independent/inexpensive disks (RAID). In the RAID system, multiple storage devices may be connected to a RAID controller (e.g., via a shared bus). The RAID controller may be within a host device, or in some cases within another storage device (e.g., a data center including multiple storage devices). Here, each storage device may be part of, for example, a redundant group of storage devices, with each storage device in the group being connected in parallel to the RAID controller and including its own data backup in non-volatile memory for other storage devices in the group. To ensure power loss protection at the storage device level, each of the storage devices in the RAID system may include the aforementioned power management circuit and re-chargeable battery and may perform power loss detection, power loss handling, and battery re-charging as previously described. Moreover, to ensure power loss protection at the host device level so that the RAID controller may service its various connected storage devices in the RAID system, the RAID controller may be similarly coupled to a power management circuit and re-chargeable battery and similarly perform power loss detection, power loss handling, and battery re-charging such as previously described.

Furthermore, if any storage device in the RAID system loses power, that storage device may provide a message to the RAID controller notifying of the detected imminent loss in power. For example, the message may inform the RAID controller that the storage device has activated its emergency power supply from its battery to complete its data writes, that the host should not send any additional data to the storage device to be written in the interim, and that the host should inspect the other storage devices in the RAID system to make sure these devices are not experiencing a similar power loss situation. In response to the message, the host may notify the other storage devices in the RAID system of the imminent power loss, and the host may instruct each of the other storage devices to perform a battery power check to make sure each storage device's battery is at full charge capacity in the event of a device power loss. As a result, the host may verify the power state of the other storage devices before the host continues to write data to these other storage devices, or before data for the power lost storage device is backed up to any of these other storage devices. As a result, UGSD in a RAID system may similarly be addressed.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
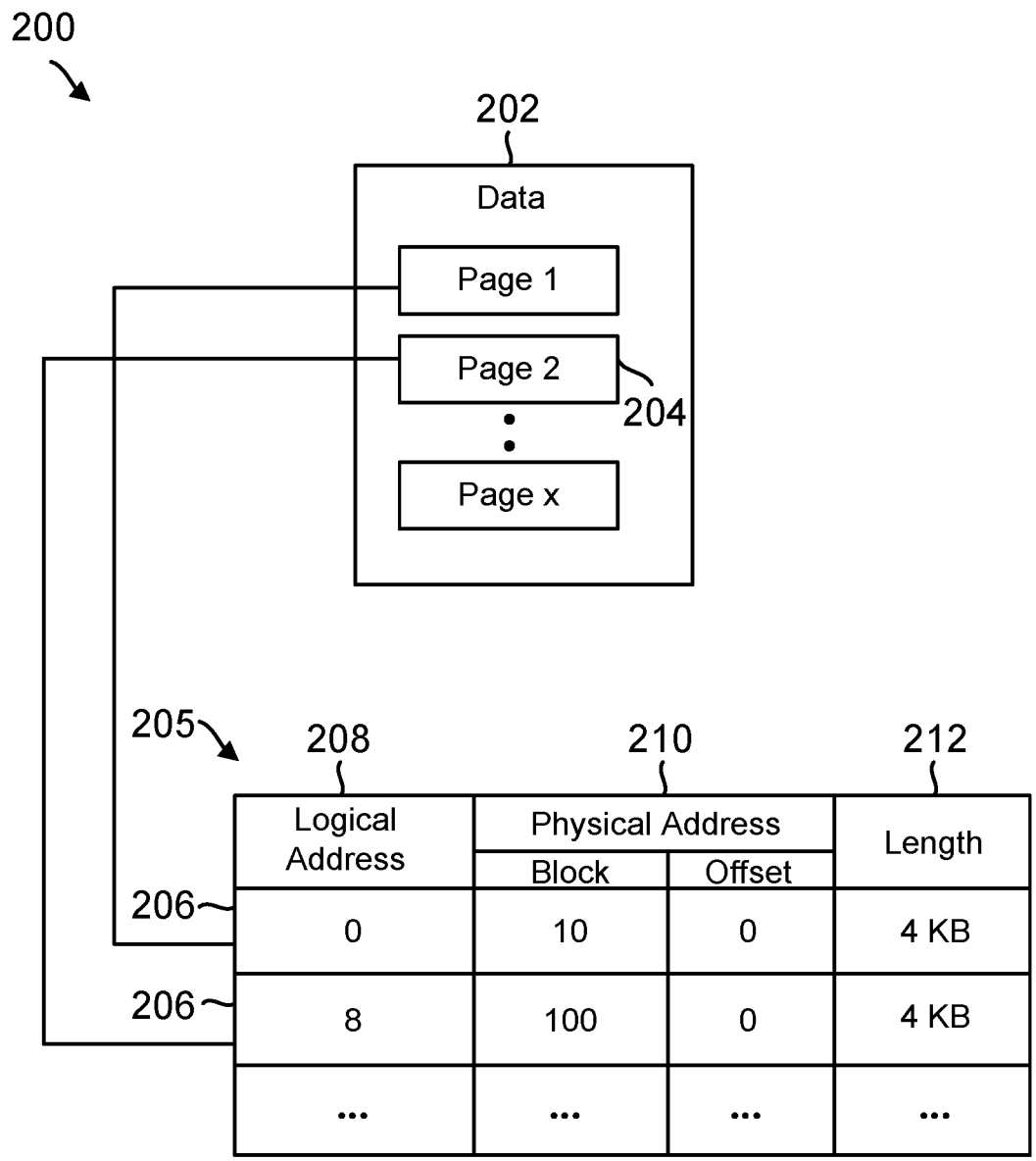
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the UP mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
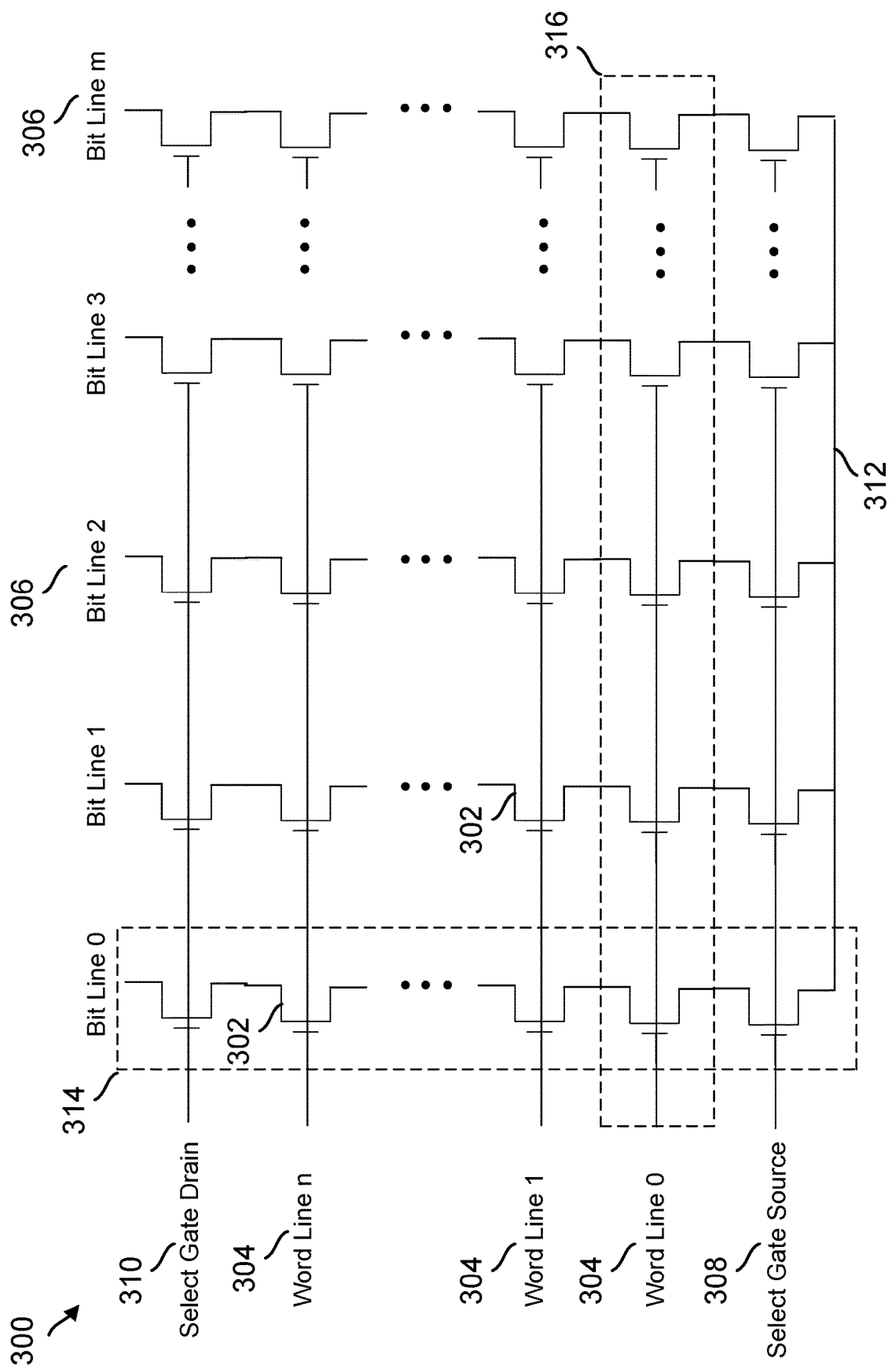
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
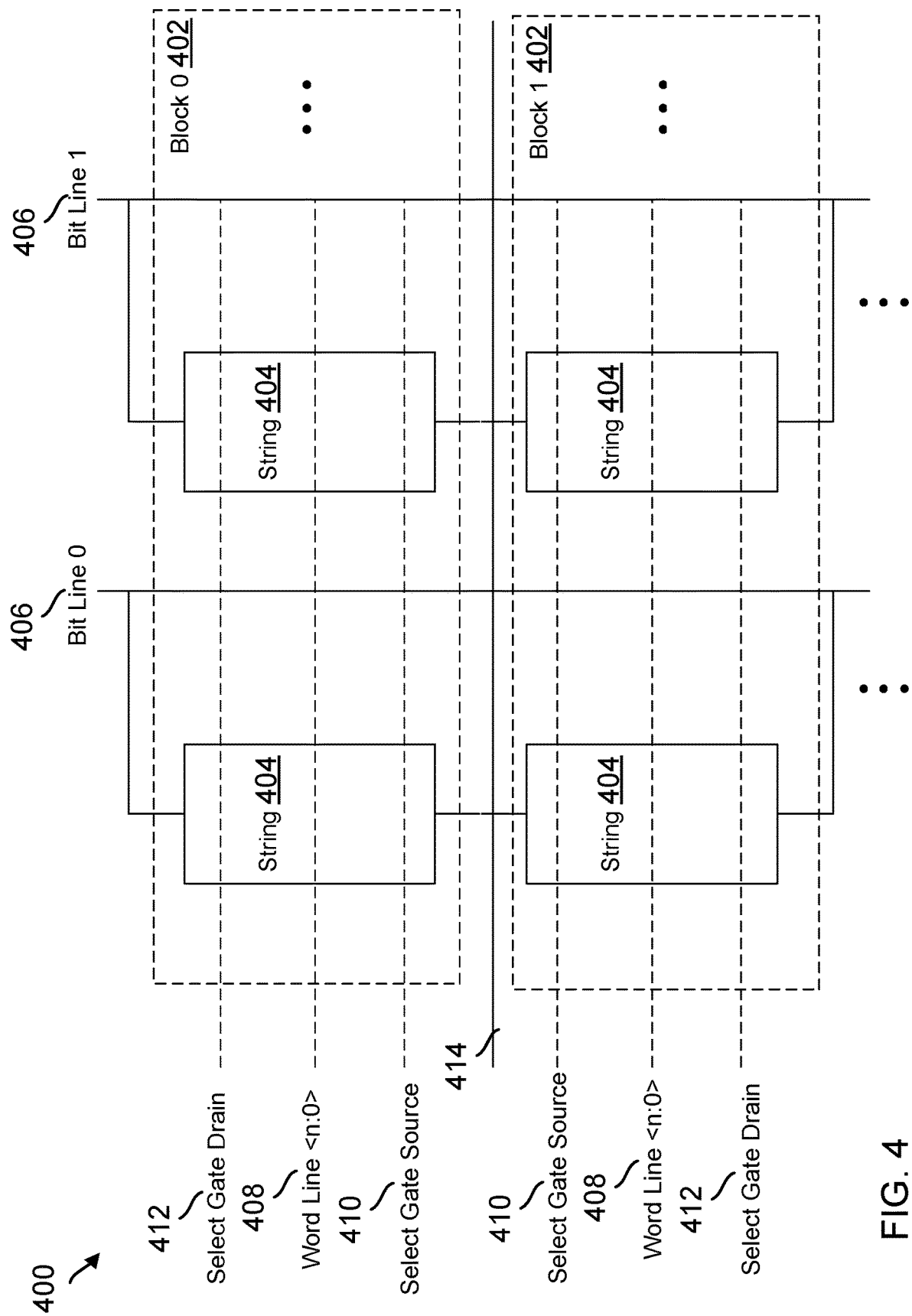
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

For cells that store multiple bits (e.g. MLCs, TLCs, etc.), each word line 304, 408 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 408 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 408 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 5:
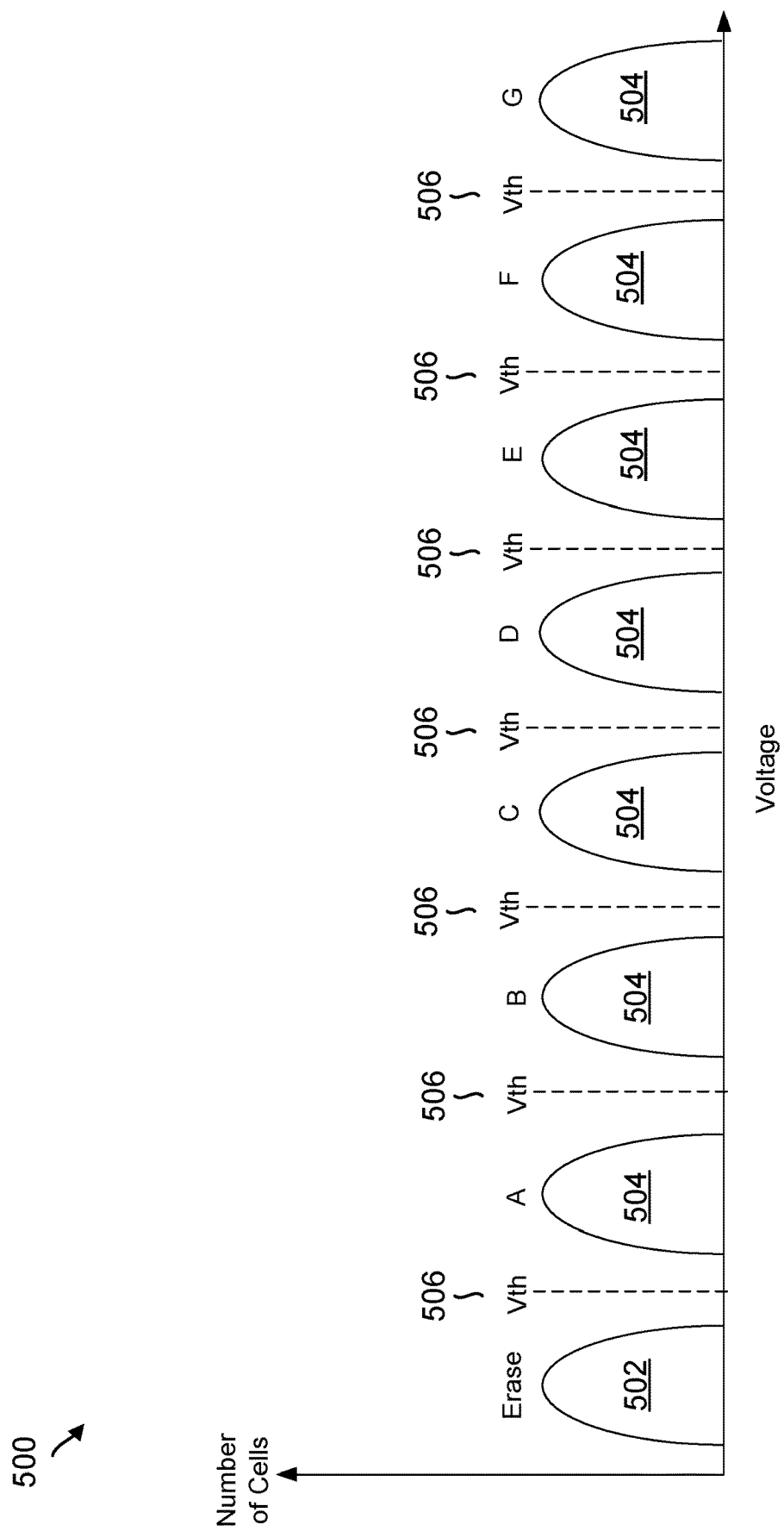
FIG. 5 is a graphical diagram illustrating an example of a voltage distribution chart for triple-level cells in the storage device of FIG. 1.

FIG. 5 illustrates an example of a voltage distribution chart 500 illustrating different NAND states for TLCs (e.g. cells 116, 302) storing three bits of data (e.g. logic 000, 001, etc. up to logic 111). The TLCs may include an erase state 502 corresponding to logic '111' and multiple program states 504 (e.g. A-G) corresponding to other logic values '000-110'. The program states 504 may be separated by different threshold voltages 506. Initially, the cells 116, 302 may be in the erase state 502, e.g. after the controller 123 erases a block 402 including the cells. When the controller 123 program LPs, MPs, and UPs as described above, the voltages of the cells 116, 302 may be increased until the threshold voltages 506 corresponding to the logic values to be stored are met, at which point the cells transition to their respective program states 504. While FIG. 5 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

While the controller 123 is programming data 119 in cells 116, 302 of blocks 402 to program states 504, the controller may experience a loss in power from the host device 104 resulting in UGSD. To supplement this loss in power, the storage device 102 may include a battery that supplies emergency power to the storage device in the event power loss is detected. The battery may be sized to supply power over a certain amount of time. For example, the battery may be designed to span an area of half a millimeter squared in the storage device and produce 10 seconds of constant power. The storage device may also include a power management circuit, such as a PMIC, which may detect and handle an imminent loss of power from the host device. The power management circuit may detect whether an UGSD is about to occur based on an amount of power reduction over time. For instance, if the power management circuit detects that host-supplied power is reduced from full capacity to 75% capacity in a short period of time (e.g., 100 μs), the rapid loss in power may indicate to the power management circuit that host-supplied power will reduce to 0% shortly. To address this imminent loss in power, the power management circuit may route emergency power from the battery to the other components of the storage device (e.g., the controller 123 and the NVM 110). For example, the power management circuit may be coupled to the battery via a switch (e.g., a transistor switch) which the power management circuit may trigger in response to the power loss detection. Alternatively, the battery may be coupled to the power management circuit without a switch. In either case, the battery may be connected in parallel to a power source from the host device (via the power management circuit) and, in response to the rapid loss of host supplied power, the battery may supply emergency power in the host's stead to the storage device components. In this way, the controller may obtain additional time (e.g., 10 seconds or other amount of time provided by the emergency power) to handle the programming of the data 119 in the cells 116, 302 of the block 402. For instance, the controller may complete programming the data 119 in response to a host write command, store control data (e.g., L2P entries), file system updates, or other metadata in the NVM 110, and perform other outstanding operations to result in a GSD. After the storage device powers back up, the storage device may perform other power loss protection measures, such as notifying the host device that a block recovery operation for the block 402 is taking place or has completed, and that the host may program further data to that block.

Additionally, whenever the battery is not in use to supply emergency power, the battery may be recharged. This recharging of the battery may be a regular operation of the storage device 102. For example, every day or other configured period of time, the power management circuit may detect the current charge of the battery. The detection may regularly occur even if a power loss event has not transpired, since battery charge leakage may still occur even if the battery is on standby and not being used for supplying power. If the power management circuit detects that the current charge of the battery is below full capacity, the power management circuit may recharge the battery until full capacity is obtained. For instance, the power management circuit may trigger a switch allowing current from a current source in the storage device to reach and charge the battery. Thus, the storage device 102 may increase the likelihood that the battery is available at full charge when applied to address UGSD. Moreover, in some cases, the storage device may further include capacitors wired in parallel to the battery and host power source to add additional emergency power to the storage device, for example, at the same time as the battery or if the battery power is depleted. These capacitors may similarly be recharged like the battery on a regular basis to increase likelihood that sufficient emergency power is available in the event of a power loss detection.

Figure 6:
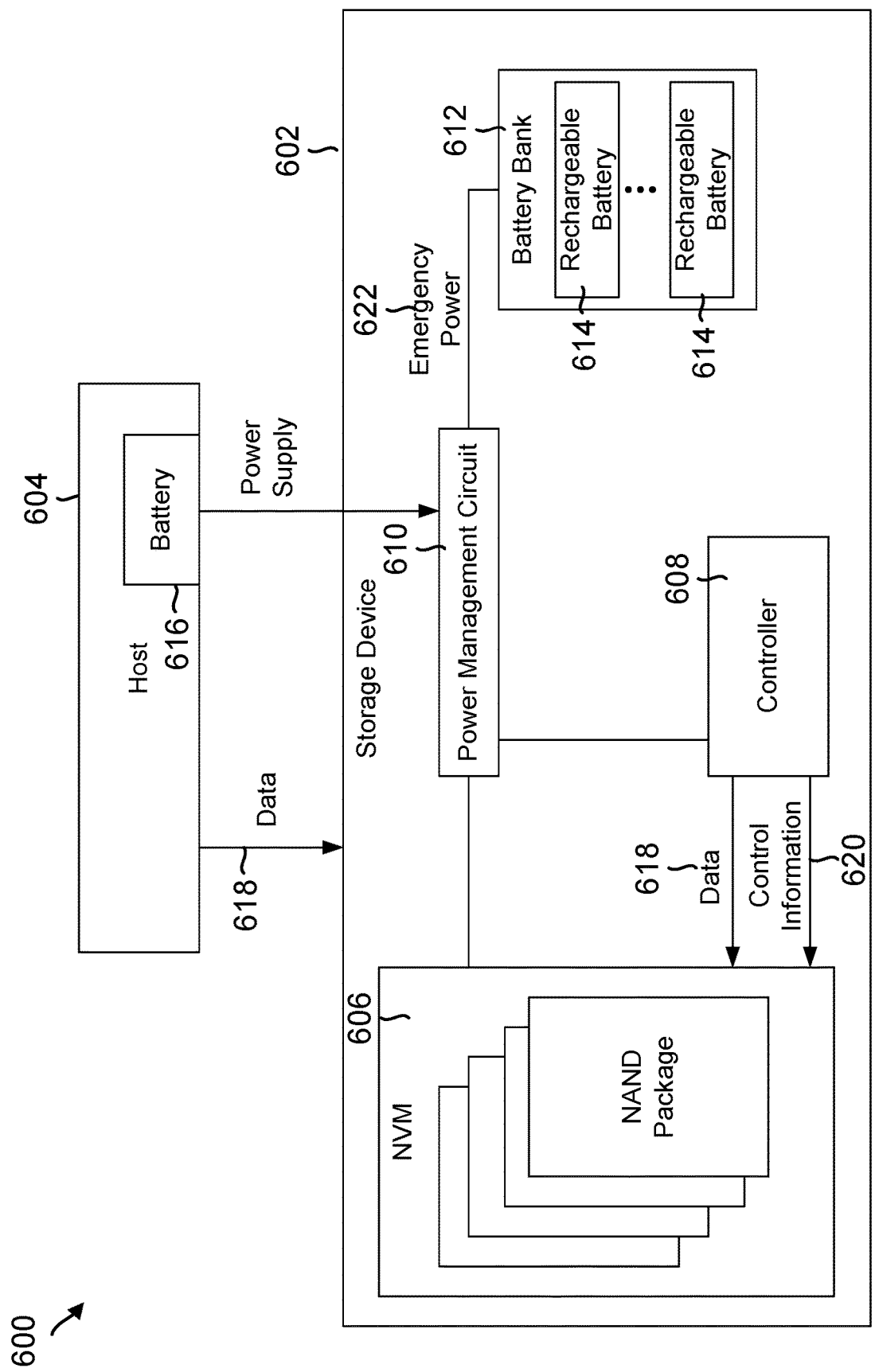
FIG. 6 is a conceptual diagram illustrating an example of a storage device such as the storage device of FIG. 1 in communication with a host device, where the storage device includes rechargeable batteries for power loss protection.

FIG. 6 illustrates an example 600 of a storage device 602 in communication with a host device 604. Storage device 602 may correspond to storage device 102, and host device 604 may correspond to host device 104. The storage device 602 may include a NVM 606 (e.g., NVM 110) including NAND packages (e.g., groups of multiple dies), a controller 608 (e.g., controller 123), a power management circuit 610 (e.g., a PMIC), and a battery bank 612 including one or more rechargeable batteries 614 (e.g., Li-ion batteries). The storage device may also include other components than illustrated, including a DRAM in some cases. The storage device 602 may include a PCB board which connects the NVM, controller, power management circuit, battery bank, and other components of the storage device.

The host device 604 may include a battery 616 or other power source which supplies power (e.g., 3.3 V) to the storage device. While FIG. 6 illustrates the example of the battery 616 being internal to the host device 604, in other examples the battery 616 may be external to the host device. The power management circuit 610 may receive the voltage supplied by the battery 616 or the host device 604, and the power management circuit may regulate this voltage using one or more voltage regulators to form various output voltages for powering the other components of the storage device 602. For example, the power management circuit 610 may supply one regulated voltage of 0.8 V to the controller 608, another regulated voltage of 2.5 V to the NVM 606, and another regulated voltage of 1.8V to a DRAM (if existing). The host device may also provide data 618 (e.g., data 119) to the controller 608 to be stored in the NVM 606 (e.g., in write commands). Using the host-supplied power regulated by the power management circuit 610, the controller 608 may write the data 618 as well as control information 620 (metadata) such as L2P entries and file system updates to the NVM 606.

In the event of a UGSD, the power management circuit 610 may detect a loss in host-supplied power from the host device 604. In response to this power loss detection, the power management circuit may route emergency power 622 supplied by the rechargeable batteries 614 in the battery bank 612 to the NVM, controller, and other components of the storage device 602. For instance, the power management circuit 610 may include a switch triggered in response to the power loss detection which connects the battery 616 with the battery bank 612. As a result, the voltage regulators in the power management circuit may receive the total voltage supplied by the rechargeable batteries 614 in the battery bank 612, thereby allowing the power management circuit to deliver regulated, emergency power to the other components of the storage device in a similar manner as the host-supplied power to address UGSD.

Figure 7:
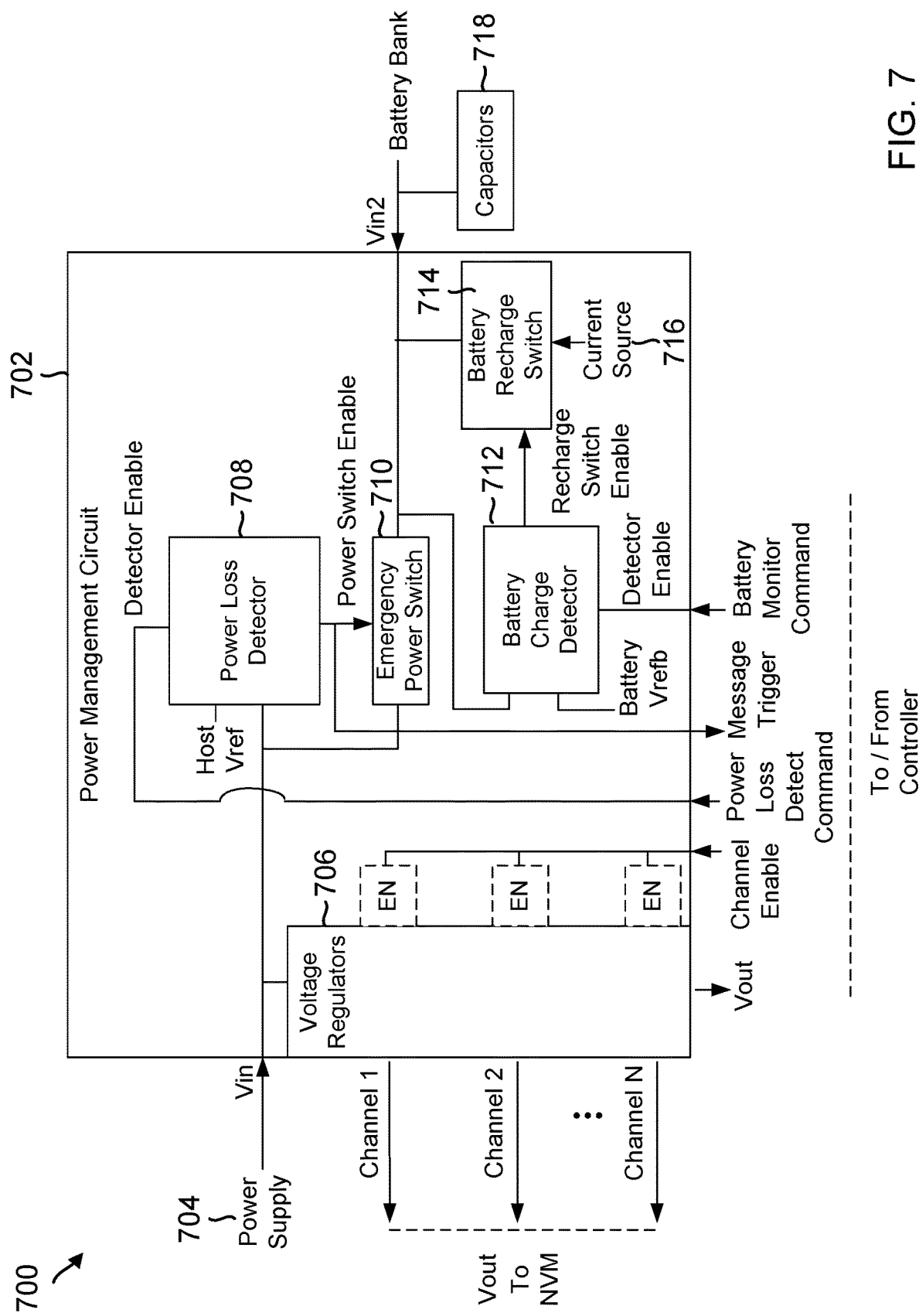
FIG. 7 is a conceptual diagram illustrating an example of a power management circuit in the storage device of FIGS. 1 and 6.

FIG. 7 illustrates an example 700 of a power management circuit 702 (e.g., power management circuit 610) in the storage device 102, 602. As will be further described, the power management circuit 702 may be configured to perform various functions, including regulating and supplying power to various components of the storage device 102, 602, detecting a loss in power supplied by the battery 614 (e.g., in host device 104, 604), routing emergency power from the battery bank 612 to the various components of the storage device in response to a detected loss of power, detecting reduction in charge of rechargeable batteries 614 in the battery bank, and re-charging the rechargeable batteries in response to the detected charge reduction. To perform each of these functions, the power management circuit 702 may include various inputs, outputs, wiring, and structural components such as illustrated in the example of FIG. 7. However, it should be noted that the structure and arrangement of components in the example of FIG. 7 is intended merely to be illustrative in nature and not limiting, as the power management circuit may be configured to perform the aforementioned functions based on different inputs, outputs, wiring, or other structural components than those illustrated.

In one example, the power management circuit 702 may receive an input voltage Vin corresponding to a power supply 704 from the battery 614. As previously described, battery 614 may be internal to or external to host device 604. Alternatively, the power supply 704 may originate from a RAID controller in a RAID system, as further described below with respect to FIG. 8. The power management circuit 702 may include voltage regulators 706 which receive and regulate the input voltage Vin for various components of the storage device 602. For instance, the power management circuit may include one voltage regulator which transforms a Vin of 3.3 V to a Vout of 0.8 V for delivery to the controller, and another voltage regulator which transforms the Vin of 3.3 V to another Vout of 2.5 V for delivery to the NVM. In a multi-channel device where the NVM has multiple NAND packages including multiple channels (e.g., one channel connecting one or two dies of a package), the voltage regulators 706 may output one or more voltages for delivery to different channels in the NVM. For instance, in the illustrated example of FIG. 7, the voltage regulators 706 may output a same output voltage Vout or different output voltages Vout1 . . . N to N channels, where N is a given number of channels in the NVM. The controller may also provide a channel enable signal to the power management circuit which controls whether a particular channel's Vout is output or not from the voltage regulators. For instance, each channel may be coupled to a channel enable switch (illustrated in FIG. 7 as EN) which is enabled or disabled in response to the value of the channel enable signal. In this way, the controller may configure the power management circuit to control an amount of power delivered to a specific channel (e.g., by disabling switches/power to the other channel(s)).

The power management circuit 702 may include a power loss detector 708 which is configured to detect whether a loss in host/RAID-controller supplied power has occurred resulting in an imminent UGSD. In one example, the power loss detector may be a comparator which compares the input voltage Vin (corresponding to the received power supply) with a host voltage reference Vref (corresponding to the voltage threshold for a power loss detection), and which outputs a power switch enable signal in response to the comparator result. An emergency power switch 710 may also receive the power switch enable signal from the power loss detector (e.g., in a gate of a transistor switch), and the emergency power switch may be configured to couple or de-couple the power supply line (Vin) and the battery bank line (Vin2) (e.g., couple the source and drain of the transistor switch) depending on the value of the power switch enable signal.

The power loss detector 708 may also include a detector enable input which the controller may use to enable or disable the comparator in response to a power loss detect command. For instance, if the controller provides a power loss detect command enabling the power loss detector (e.g., transmitting a value '1' to the detector enable input), the power loss detector may compare Vin with Vref and output the power switch enable signal accordingly, while if the controller does not provide a power loss detect command (e.g., transmitting or leaving the detector enable input with a value '0'), the power switch enable signal may be fixed to maintain a de-coupling of the power supply line and battery bank line notwithstanding Vin. Alternatively, the power management circuit may include firmware or hardware, or a combination of firmware and hardware, which provides the power loss detect command in lieu of the controller.

In one example of operation (assuming the power loss detector is enabled), if Vin>Vref, the power loss detector/comparator may output one value (e.g., 0) for the power switch enable signal indicating that a rapid loss in power has not occurred, thereby disabling the emergency power switch and de-coupling the power supply line and the battery bank line. In this way, the battery bank remains disconnected from the other components of the storage device since emergency power is not needed. On the other hand, if Vin<Vref, the comparator may output another value (e.g., 1) for the power switch enable signal indicating that a rapid loss in power has occurred, thereby enabling the emergency power switch and coupling the power supply line and the battery bank line. In this way, the battery bank may be connected to the other components of the storage device to supply emergency power to the storage device components when UGSD occurs.

For instance, in one example where the power loss detector 708 is configured to detect a 25% reduction in power and Vin is 3.3 V, Vref may be configured to be 2.5 V (e.g. 75% of Vin). Generally, Vin=3.3 V>Vref=2.5 V, so the emergency power switch would be disabled and only the power supply line (e.g., Vin) connects to the voltage regulators to be delivered to the various components of the storage device. If later on the storage device is unexpectedly disconnected from the host device or some other scenario occurs resulting in Vin dropping below Vref (<2.5 V), the emergency power switch would be enabled and the battery bank line (e.g., Vin2) would now connect to the voltage regulators. Thus, emergency power may now be delivered to the various components of the storage device.

Moreover, the output of the power loss detector 708 (the power switch enable signal) may be transmitted to the controller as a message trigger in a RAID system. For instance, if the output of the comparator indicates that a rapid loss in power has occurred (e.g., the value of the power switch enable signal is 1), the controller of the storage device may provide a message to the RAID controller (e.g., internal to or external to a host device) indicating the power loss detection. More details with respect to this message in a RAID system are described below with respect to FIG. 8.

The power management circuit 702 may also include a battery charge detector 712 which is configured to detect whether a loss in battery supplied power (Vin2) has occurred. In one example, the battery charge detector may be a comparator which compares the input voltage Vin2 (corresponding to the emergency power supply) with a battery voltage reference Vrefb (corresponding to the voltage threshold for a battery loss detection), and which outputs a recharge switch enable signal in response to the comparator result. A battery recharge switch 714 may also receive the recharge switch enable signal from the battery charge detector (e.g., in a gate of a transistor switch), and the battery recharge switch may be configured to couple or de-couple a current source 716 and the battery bank line (Vin2) (e.g., couple the source and drain of the transistor switch) depending on the value of the recharge switch enable signal.

The battery charge detector 712 may also include a detector enable input which the controller may use to enable or disable the comparator in response to a battery monitor command. For instance, the controller may periodically issue a battery monitor command (e.g., daily) to the power management circuit 702 to check the charge of the rechargeable batteries in the battery bank. If the controller provides this command enabling the battery charge detector (e.g., transmitting a value '1' to the detector enable input), the battery charge detector may compare Vin2 with Vrefb and output the recharge switch enable signal accordingly, while if the controller does not provide a battery monitor command (e.g., transmitting or leaving the detector enable input with a value '0'), the recharge switch enable signal may be fixed to maintain a de-coupling of the current source 716 and battery bank line notwithstanding Vin2. Alternatively, the power management circuit may include firmware or hardware, or a combination of firmware and hardware, which provides the periodic, battery monitor command in lieu of the controller.

In one example of operation (assuming the battery charge detector is enabled), if Vin2=Vrefb, the battery charge detector/comparator may output one value (e.g., 0) for the recharge switch enable signal indicating that a reduction in battery charge has not occurred (the battery is at full capacity), thereby disabling the battery recharge switch and de-coupling the current source and the battery bank line. In this way, the battery bank remains disconnected from the current source since a recharge is not needed. On the other hand, if Vin2<Vrefb, the comparator may output another value (e.g., 1) for the recharge switch enable signal indicating that a reduction in battery charge has occurred (the battery is not at full capacity), thereby enabling the battery recharge switch and coupling the current source and the battery bank line. In this way, the battery bank may be connected to the current source to re-charge the batteries so that emergency power may be sufficiently supplied to the storage device components when UGSD occurs.

The power management circuit may couple one or more capacitors 718 to the host/RAID-controller provided power supply which provide additional emergency power in the event of a power loss detection. The charge from the capacitors which provides this additional emergency power may be supplied to the various components of the storage device in a similar manner as the emergency power supplied from the battery bank. For instance, the power loss detector 708 may couple the capacitors to the power supply line through activation of the emergency power switch in response to a detection that Vin<Vref. Similarly, the power management circuit may re-charge the capacitors in a similar manner as the re-chargeable batteries in the battery bank. For instance, the battery charge detector may couple the current source to the line wired to the capacitors through activation of the battery recharge switch in response to a detection that Vin2<Vrefb. Thus, even if the battery bank is depleted between periodic battery monitor commands, additional emergency power may be supplied by or stored in these capacitors for use in the event a UGSD occurs.

Thus, in the example illustrated and described above with respect to FIGS. 6 and 7, a standalone storage device may include rechargeable batteries internally in a battery bank wired to the storage device's PCB board, which charge may be routed to a power supply line from a host device in the event of a power loss detection, and which charge may be periodically monitored and recharged to maintain full battery capacity. However, in other examples, the storage device may not be standalone but may be part of a RAID system with other storage devices. In such examples, the RAID system may include rechargeable batteries in a battery bank that are external to the storage devices and shared commonly among the connected storage devices. For instance, the external batteries may be included in a host or RAID controller or may be attached to a peripheral which is connected to the host or RAID controller.

In one example of the aforementioned RAID system, the power management circuit of each storage device may operate in a similar manner as that described above with respect to FIG. 7, but the battery bank may instead be external to the storage device and shared among multiple storage devices. As an example, the power management circuit of each storage device may couple the external batteries to the storage device's internal components for supply of emergency power, as well as recharge these external batteries to ensure sufficient emergency power is available, using the same or similar inputs, outputs, wiring, and structural components as illustrated in FIG. 7. The host device or RAID controller may also include a power management circuit which may similarly supply emergency power from the external batteries and recharge the external batteries. For instance, the power management circuit may route emergency power from the external batteries to host device/RAID controller components (e.g., processors, memories, etc.), as well as to internal components of any of the storage devices, using the same or similar inputs, outputs, wiring, and structural components as illustrated in FIG. 7. Thus, even if supplied power from an internal battery to a host/RAID controller is lost (e.g., due to a thermal shock, power plant failure, hacker attack, or other scenario), the host or RAID controller may have sufficient power supplied by the external batteries to operate its processor(s), memory, and power management circuit. The host or RAID controller may route emergency power from these batteries to its components, or to storage device components, in response to a message from a storage device indicating (or a detection at the host/RAID controller) of an imminent UGSD.

For instance, in one variation of the examples of FIGS. 6 and 7, the power supply received by the power management circuit 610, 702 may originate from a RAID-level battery which supplies power to multiple storage devices in a RAID system. This RAID-level battery may be internal to a host device (e.g., battery 616 in host device 604), internal to a RAID controller (e.g. in a host device or another storage device), or external to the host device or the RAID controller (e.g., in a peripheral attached to the host device or other storage device). Moreover, each of these storage devices may include its own NVM 606, controller 608, power management circuit 610, 702, and in some cases, battery bank 612 internally supplying emergency power to the components of the respective storage device. Additionally, a battery bank external to the host device or the RAID controller, and external to each storage device (in addition to or in lieu of battery bank 612), may be coupled to the power management circuit 610, 702 of each storage device for supplying emergency power to the RAID system. If the power management circuit 610 in one of these storage devices 602 detects a loss in power supplied by the RAID-level battery, the storage device may alert the host device or RAID controller of the power loss via a message or power loss assert (PLA). The host device or RAID controller may similarly alert other storage devices in the RAID system of the detected loss in power via a power loss notification (PLN). This power loss signaling between host and storage devices may be accomplished via a communication protocol incorporating dedicated command sequencing, addressing, and acknowledgment associated with PLAs or PLNs. The host device/RAID-controller may similarly include a power management circuit (e.g., power management circuit 610, 702) which couples the battery 616 to the host device's processor, memories, etc., and the external battery bank for emergency power may be coupled to the power management circuit 610, 702 of the host device/RAID controller. Thus, even if the power management circuit in the host device/RAID controller detects a loss in power supplied by the RAID-level battery, the host device/RAID controller may operate using the emergency power from the external battery bank.

Moreover, the host device/RAID controller or storage devices in a RAID system may calculate an optimal power to be distributed to different storage devices in the RAID system in the event of a UGSD. For instance, a host device may determine an optimal amount of emergency power to be supplied to a given storage device from the external battery bank based on a power loss signal or message provided by the storage device, a program data rate of the storage device, and the amount of data 618 the host device has provided to the storage device to be programmed in NVM 606. As an example, if the host device receives a power loss signal from a storage device having a programming speed of 500 MB/s, and if the host device had sent 1 GB of data to that storage device for programming, the host device may determine that the storage device will take two seconds to completely program the 1 GB of data. In such case, the host device may determine, for example, that the optimal amount of emergency power which the storage device may use to completely program the data in two seconds is 2 W of power.

Thus, rather than simply supplying all of the emergency power available in the external battery bank to the storage device such as previously described for a standalone storage device, here in the RAID system the host device may ration a certain amount of power to that storage device to ensure the storage device completes its ongoing operation prior to UGSD while leaving charge remaining in the external battery for supplying emergency power to other storage devices if necessary. The host device may ration the emergency power supplied by the external batteries through the power management circuit 702. The power management circuit 702 for the host device may be similar to that for each storage device, except that here the battery bank is RAID-level (e.g., external to the storage devices), the emergency power switch 710 controls whether emergency power is supplied to all the storage devices in the RAID system, and the channel enable switches control which of these storage devices in the RAID system receive the emergency power (e.g., each channel in FIG. 7 corresponds to a different storage device). Thus, the host device may issue one or more commands to enable the emergency power switch 710 and channel enable switches (or other switches) to allow only a certain amount of charge from the external battery bank to flow to the storage device (e.g., corresponding to 2 W of power in the aforementioned example). The host device may control the amount of charge flow, for example, by enabling the battery charge detector 712 to detect whether an amount of charge corresponding to 2 W of power has depleted from the battery bank, in which case the host device may disable the emergency power switch/channel enable switches to prevent further charge depletion from the battery bank.

In another example, the host device may supply all the available emergency power to a storage device which is undergoing operations while refraining from supplying any emergency power to storage devices which are not currently undergoing operations. For instance, if the host device in the RAID system determines that the storage device undergoing UGSD in the example above requires 2 W of power to finish its 2 seconds of ongoing operations, the host device may also determine that another storage device in the RAID system is idle or inactive. In such case, rather than merely rationing 2 W of power to the former storage device and remaining power to other storage devices including the idle/inactive storage device, the host device may completely disable supply of emergency power to the idle/inactive storage device. For instance, the host device may disable the corresponding channel enable switch for the idle/inactive storage device to prevent supply of emergency power to that storage device such as previously described.

Additionally, each storage device may ration the supply of emergency power from their own internal battery bank (and/or external battery bank) using the power management circuit 702 in identical or similar manner to that previously described for the host device. For instance, the storage device may control and limit an amount of emergency power from battery bank 612 (or the RAID-level battery bank) which is allocated or allowed to flow to a particular channel in the NVM using the emergency power switch, channel enable switches, battery charge detector, or other components of the storage device. Furthermore, in some examples, one of the channels in the power management circuit may be coupled to the host device, and the storage device may similarly supply and ration emergency power from its internal battery bank to the host device in response to, for example, a power loss notification from the host device. Thus, the host device and the storage devices in the RAID system may determine and supply an optimal amount of emergency power to each other in response to power loss signaling from other devices.

Thus, the power management circuit 610, 702 of the storage device 102, 602 and host device 604 (or RAID controller) may re-route the supply of power from the host device to the battery bank (e.g., storage device-level or RAID-level batteries) when a UGSD is imminent (e.g., using the power loss detector 708 and emergency power switch 710). The power management circuit may also detect and replenish the current charge of the rechargeable batteries in the battery bank (e.g., using battery charge detector 712, battery recharge switch 714, and current source 716) in response to periodic monitoring (e.g., a daily battery monitor command received from the controller 123, 608 or RAID controller). Using the emergency battery power supplied by the battery bank, the controller of a storage device may write control information 620 (e.g., metadata such as control data, file system updates, or other key user data) to the NVM 110, 606, thereby allowing the storage device to have updated control information in the next power cycle and facilitating rapid storage device recovery. The power management circuit 610, 702 may also route the emergency power from the battery bank to one or more specific channels of the NVM 606 where control data, file system entries, or other metadata is stored. For example, in a storage device including a plurality of NAND packages each having a plurality of dies connected in parallel on a given channel (for example, 8 parallel channels each coupled to 2 dies out of a total of 16 dies in 4 NAND packages), if the controller determines that one of the channels is being programmed with metadata while the other channels are idle or inactive, the power management circuit may be configured to cut power to these idle/inactive channels (e.g., in response to a channel enable signal from the controller which disables the channel enable switches coupled to the voltage regulators 706 for idle/inactive channels). As a result, the storage device may maximize the amount of emergency power supplied to the active channel to complete writing the control information to the NVM in anticipation of an UGSD. The storage device may act similarly to prioritize different channel(s) for writing control information or other data to the NVM by supplying more (or all) emergency power to these channel(s) depending on the locations of the block(s) in which the metadata or data is being written. Additionally, in a multi-device system (e.g., a RAID system) utilizing the aforementioned power loss detection and emergency power routing, the host device or RAID controller may distribute emergency power from an external battery bank optimally among multiple storage devices in the event of a power fail situation such as previously described.

Figure 8:
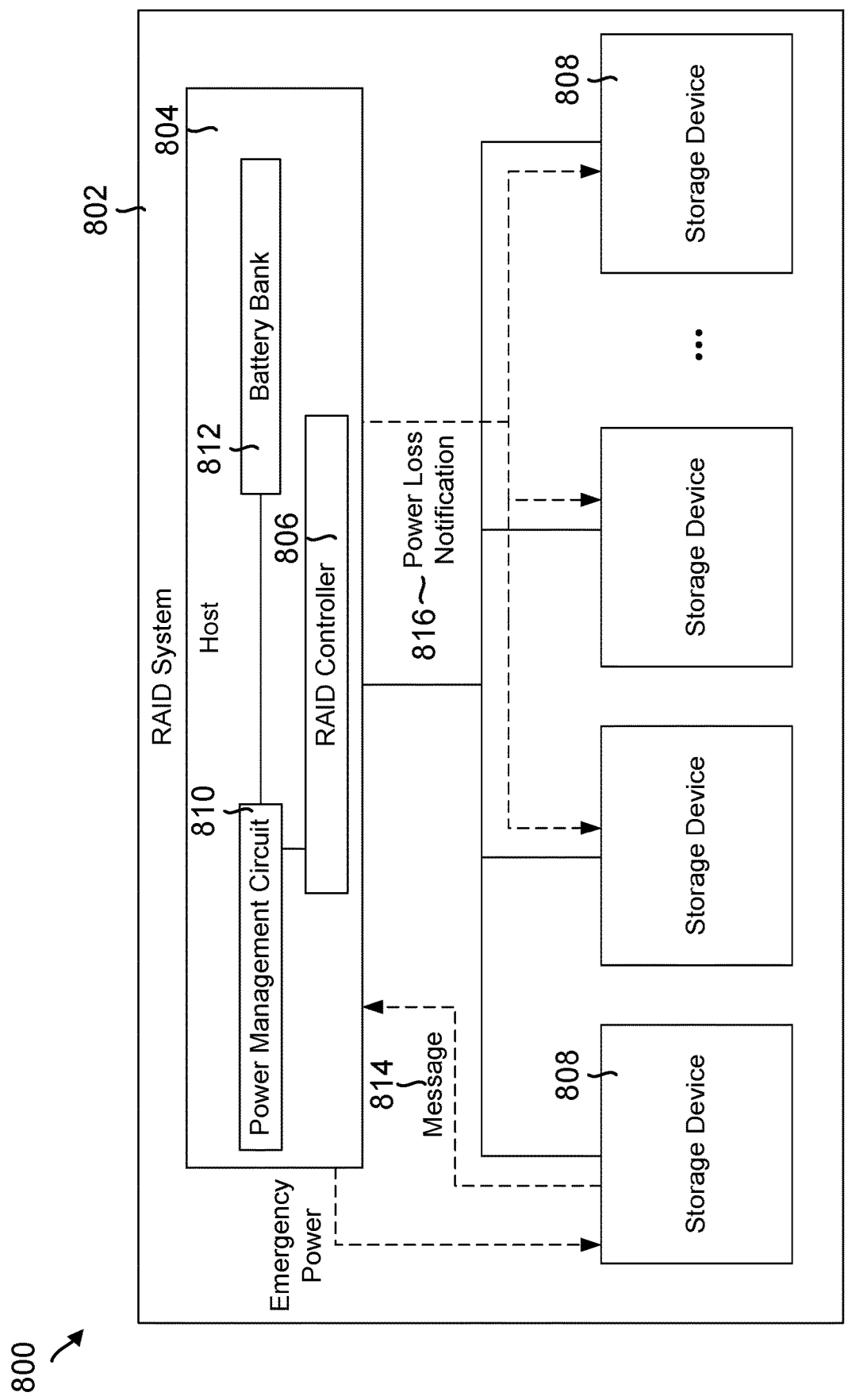
FIG. 8 is a conceptual diagram illustrating an example of a RAID system including multiple storage devices including the storage device of FIGS. 1 and 6.

FIG. 8 illustrates an example 800 of a RAID system 802 including a host device 804 with RAID controller 806, and a plurality of storage devices 808 connected to the host device 804 or RAID controller 806. Host device 804 may correspond to host device 604, and storage devices 808 may each correspond to storage device 602. Each of the storage devices 808 may include a NVM (e.g., NVM 110, 606), controller (e.g., controller 123, 608), power management circuit (e.g., power management circuit 610, 702), and battery bank for supplying emergency power in the event of UGSD (e.g., battery bank 612). Similarly, the host device 804 may include a power management circuit 810, which may be identical to or similar to power management circuit 610, 702, and a battery bank 812 including rechargeable batteries for supplying emergency power to the host device and its components as well as to the storage devices and its components. While battery bank 812 here is shown as being internal to host device 804, in other examples battery bank 812 may be external to host device 804. In one example, RAID system 802 may include, for example, a data center having RAID controller 806 and storage devices 808.

When one of the storage devices 808 detects a loss in power supplied from the host device 804 or RAID controller 806, in addition to handling the loss in power as previously described with respect to FIGS. 6 and 7, the storage device may provide a message 814 to the host device 804 or RAID controller 806 indicating the detected loss in power. For instance, referring to FIG. 7, if power loss detector 708 outputs a value of '1' in response to Vin (corresponding to the power supply) falling below Vref (e.g., 75% of Vin), then in addition to enabling the emergency power switch 710 to route power from battery bank 612 to the various storage device components, the output of power loss detector 708 may act as a message trigger which causes the controller 608 to transmit message 814 to the host device 804 or RAID controller 806. For instance, controller 608 may be configured to transmit message 814 in response to receiving message trigger from the power management circuit. The message 814 may indicate a current status of the storage device, including a currently written amount of data, a time which the power loss is detected to have occurred, a voltage associated with the detected power loss, and other information. From the message, the host device 804 or RAID controller 806 may ascertain that the storage device from which message 814 originated is about to enter UGSD from power loss.

In one example, when the storage device 808 provides message 814 to the host device 804 or RAID controller 806, the message may not only indicate that the storage device is about to lose power and enter UGSD, but also that the storage device has data 618 or control information 620 left to write in the NVM 606. The message may also or alternatively indicate that the storage device has already written a portion of its data or control information to the NVM using its currently available power but that the data or control information will not be fully written without additional power from the host device or RAID controller. In response the message, the host device 804 or RAID controller 806 may provide power (e.g., emergency power) to the storage device 808 from which the message originated. For instance, as previously described with respect to FIG. 7, the power management circuit 810 may activate the emergency power switch 710 to route emergency power from battery bank 812 to the RAID controller 806 or other components of host device 804, enable the output channel corresponding to that storage device, and disable one or more of the other output channels corresponding to the other storage devices (e.g., using a given value of an channel enable signal), in order to optimize (prioritizing active channels over inactive/idle channels) or maximize the amount of emergency power routed to that storage device.

In another example, the host device may store a copy of the data 618 or control information 620 left to write in the NVM 606. If the emergency power supplied by host device/RAID controller in response to message 814 is insufficient for the storage device 808 to fully program the data or control information before the storage device shuts down (notwithstanding whether the storage device is combining this emergency power from the host device/RAID controller with additional emergency power from the storage device's own battery bank 612), then the host device/RAID controller may write the data or control information to a different storage device in the RAID system (in a data backup). In another example, the message 814 may indicate the host device/RAID controller to stop or refrain from writing additional data to that storage device originating the message, due to the imminent UGSD which will occur. Thus, the host device/RAID controller may supply power to the storage device in response to the message to write existing, cached data in the storage device, rather than to write new data. In any of the aforementioned examples, the message 814 here may be a PLA signal provided by the controller 608 of the storage device which detected the loss in power, or the message may be triggered in response to an in-band failure mode via a communication interface (PCIe) between the storage device and the host device.

In a further example, after the host device 804 or RAID controller 806 receives message 814 from the storage device 808 which detected the loss in power, the host device or RAID controller may provide a power loss notification 816 to the other ones of the storage devices 808 in the RAID system 802 informing these storage devices of the detected loss in power. In response to the power loss notification 816, the host device/RAID controller may provide a command to the controller 608 of each of the storage devices to detect whether that storage device further is experiencing a loss in power from the host device or RAID controller. Alternatively, the controller of each of the storage devices may perform this detection in response to the power loss notification 816 itself. For instance, referring to FIG. 7, in response to receiving power loss notification 816, the controller 608 of each storage device (other than the storage device which sent message 814 triggering the power loss notification 816) may issue a power loss detect command enabling power loss detector 708 to compare the power supply 704 (represented by Vin) with Vref to determine if a loss in power which may result in UGSD has occurred. In this way, other storage devices in the RAID system may preemptively determine if a RAID-level power loss is occurring (e.g., due to a thermal shock, power plant failure, or hacker attack), in which case the storage devices may respectively provide messages 814 to the host device/RAID controller and cause their power management circuits 610, 702 to perform power loss handling as previously described (e.g., routing their battery bank emergency power to certain channels of the NVM 606 used to write control information 620, etc.).

Similarly, in response to the power loss notification 816, the host device/RAID controller may provide a command to the controller 608 of each of the storage devices to monitor their respective battery bank 612 to determine whether the rechargeable batteries in the bank are fully charged for supplying sufficient emergency power in the event that storage device later experiences a loss in power from the host device or RAID controller. Alternatively, the controller of each of the storage devices may perform this monitoring in response to the power loss notification 816 itself. For instance, referring to FIG. 7, in response to receiving power loss notification 816, the controller 608 of each storage device (other than the storage device which sent message 814 triggering the power loss notification 816) may issue a battery monitor command enabling battery charge detector 712 to compare the charge of the rechargeable batteries in battery bank 612 (represented by Vin2) with Vrefb to determine if a rechargeable battery is not fully charged. If the battery is not fully charged, the battery charge detector 712 may enable the battery recharge switch 714 causing the current source 716 to supply current to the battery bank and subsequently re-charge the batteries. In this way, other storage devices in the RAID system may preemptively determine if their batteries are fully charged, and thus capable of supplying sufficient emergency power to handle a RAID-level power loss (e.g., due to a thermal shock, power plant failure, or hacker attack), without having to wait until the next periodically set time (e.g., once per day). to monitor the battery bank 612.

Figure 9:
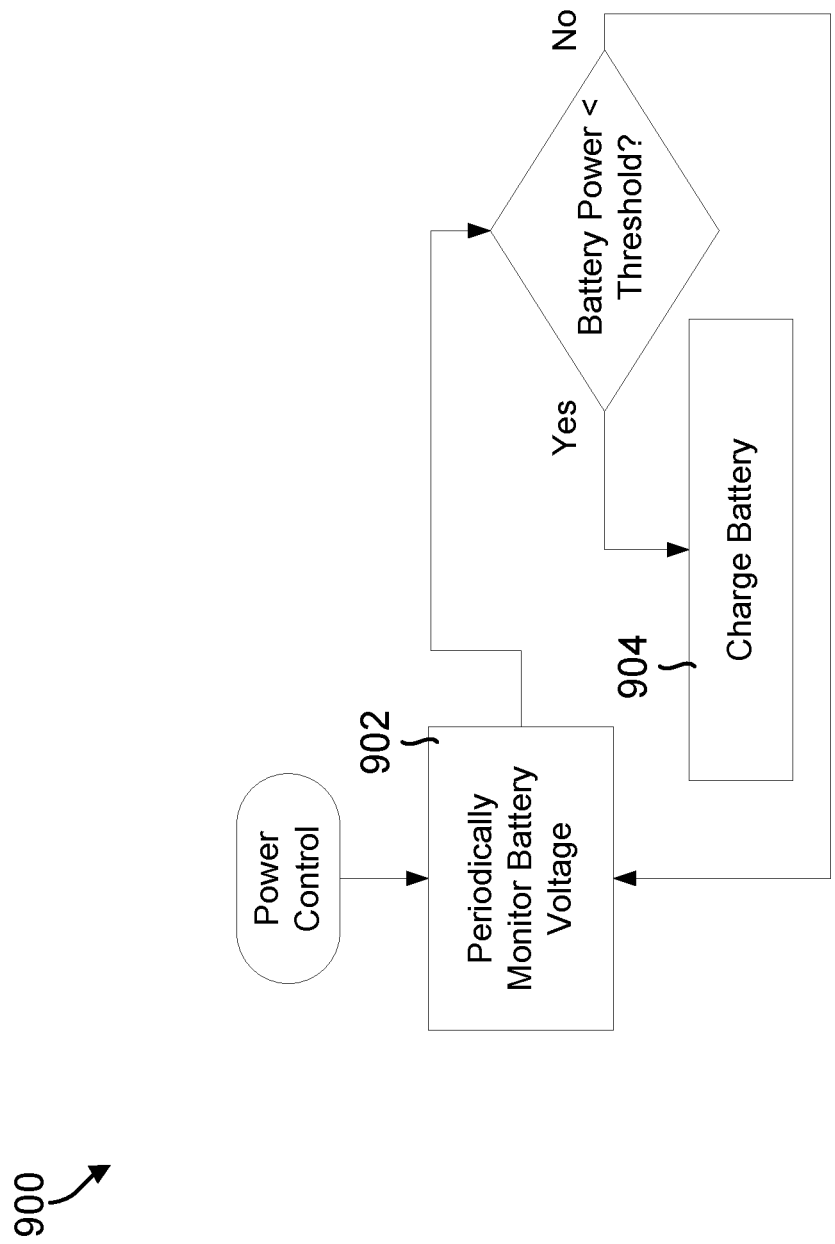
FIG. 9 is a flow chart illustrating an example of a method for power control, as performed by the storage device of FIGS. 1, 6, and 8.

FIG. 9 illustrates an example flow chart 900 of a method for power control in a storage device. For example, the method can be carried out in a storage device 102 such as the one illustrated in FIG. 1. Each of the steps in the flow chart can be controlled using the controller as described below (e.g. controller 123), by a component or module of the controller, or by some other suitable means.

As represented by block 902, the controller may periodically monitor battery voltage. For instance, referring to FIGS. 6 and 7, the controller 123, 608 may periodically send a battery monitor command to the power management circuit 610, 702 to activate battery charge detector 712 to detect a charge of rechargeable batteries 614 in battery bank 612.

As represented by block 904, if the battery charge detector detects that the battery power (charge) is less than a threshold (e.g., Vin2<Vrefb), then the power management circuit 610, 702 may enable charging of the rechargeable batteries 614. For instance, referring to FIG. 7, the power management circuit 702 may enable current source 716 to supply current to the battery bank 612 to recharge the rechargeable batteries 614 through activation of battery recharge switch 714 when the battery charge detector 712 detects Vin2<Vrefb. Once the batteries are recharged (e.g., Vin2=Vrefb), the switch is disabled and no further battery charging occurs.

Figure 10:
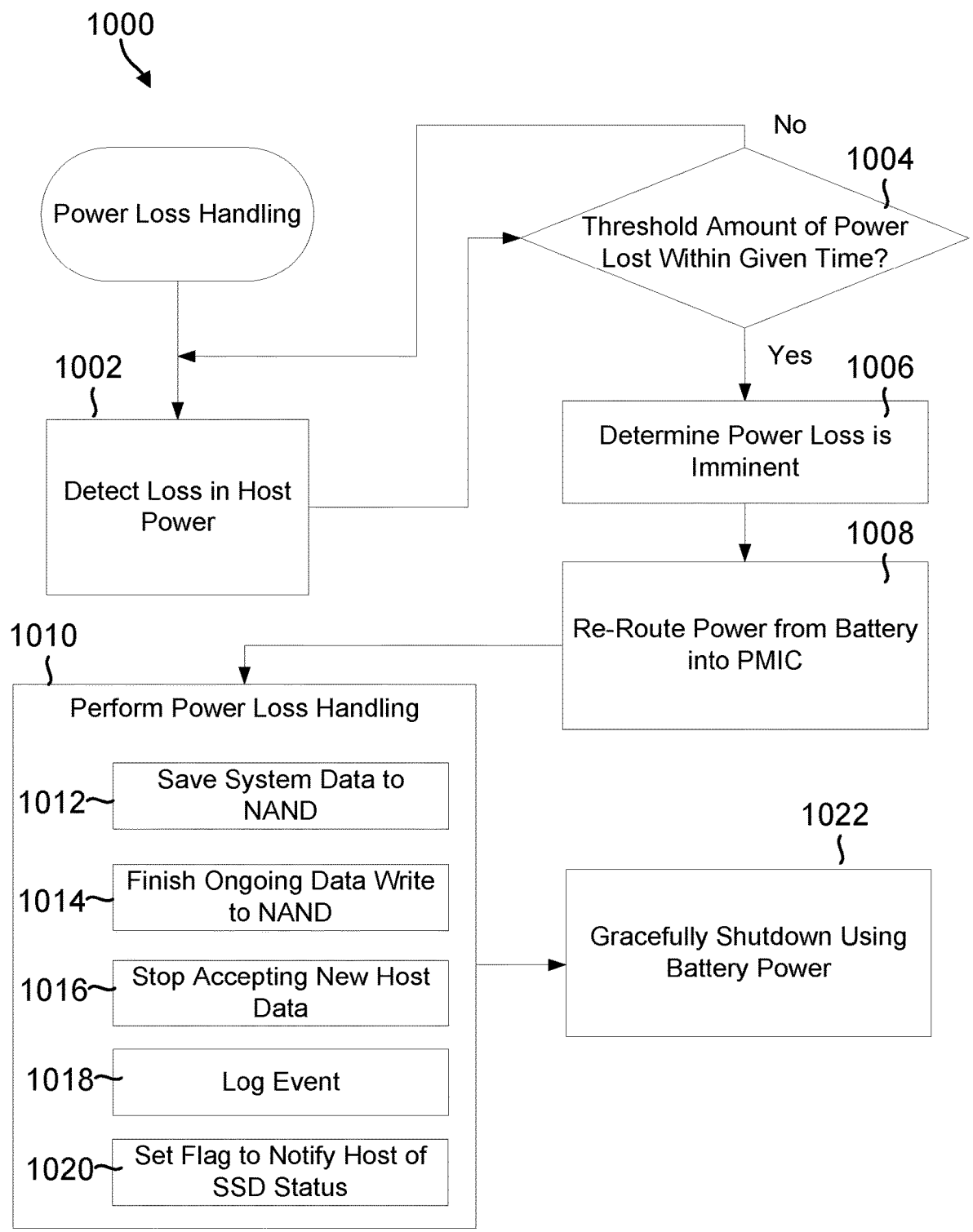
FIG. 10 is a flow chart illustrating an example of a method for power loss handling, as performed by the storage device of FIGS. 1, 6, and 8.

FIG. 10 illustrates an example flow chart 1000 of a method for power loss handling in a storage device. For example, the method can be carried out in a storage device 102 such as the one illustrated in FIG. 1. Each of the steps in the flow chart can be controlled using the controller as described below (e.g. controller 123), by a component or module of the controller, or by some other suitable means.

As represented by block 1002, the controller may detect a loss in host supplied power. For instance, referring to FIGS. 6 and 7, the controller 608 may issue a power loss detect command to power management circuit 610, 702 to activate power loss detector 708 to detect that the voltage Vin corresponding to the host power supply has fallen below Vref.

As represented by block 1004, the controller may determine whether a threshold amount of power is lost within a given time. For instance, referring to FIGS. 6 and 7, after the controller issues the power loss detect command and the power loss detector 708 determines Vin<Vref, the power loss detector may further determine whether Vin fell below Vref within a threshold period of time (e.g., 100 μs).

If so, then as represented by block 1006, the controller may determine that power loss is imminent. For instance, referring to FIGS. 6 and 7, the controller 608 may receive a message trigger from power management circuit 610, 702 (e.g., the output of power loss detector 708) indicating that a threshold amount of power loss over time was detected (e.g., 25% reduction of power over 100 μs of time), and thus that power loss is imminent.

Accordingly, as represented by block 1008, the power management circuit may re-route power from the rechargeable batteries into the power management circuit. For instance, referring to FIG. 7, the power loss detector 708 in power management circuit 702 may enable emergency power switch 710, which couples the rechargeable batteries 614 in battery bank 612 to the power supply line and thus the NVM 606 and controller 608. Thus, emergency power from the battery bank may be routed through power management circuit to the NVM and controller.

Next, as represented by block 1010, the controller may perform power loss handling. For instance, as represented by block 1012, the controller may save system data to NAND (e.g., control information 620 to NVM 606), as represented by block 1014, the controller may finish an ongoing data write to NAND (e.g., data 618 to NVM 606), as represented by block 1016, the controller may stop accepting new host data (e.g., refrain from writing additional data from the host device), as represented by block 1018, the controller may log the event (e.g., store an indication of the detected power loss in the NVM 606), and as represented by block 1020, the controller may set a flag to notify the host device of the storage device status (e.g., in message 814).

Afterwards, as represented by block 1022, the controller may gracefully shutdown using the battery power. For instance, referring to FIGS. 6 and 7, the controller 608 may perform a GSD using the emergency power supplied by the rechargeable batteries 614 through the power management circuit 610, 702.

Figure 11:
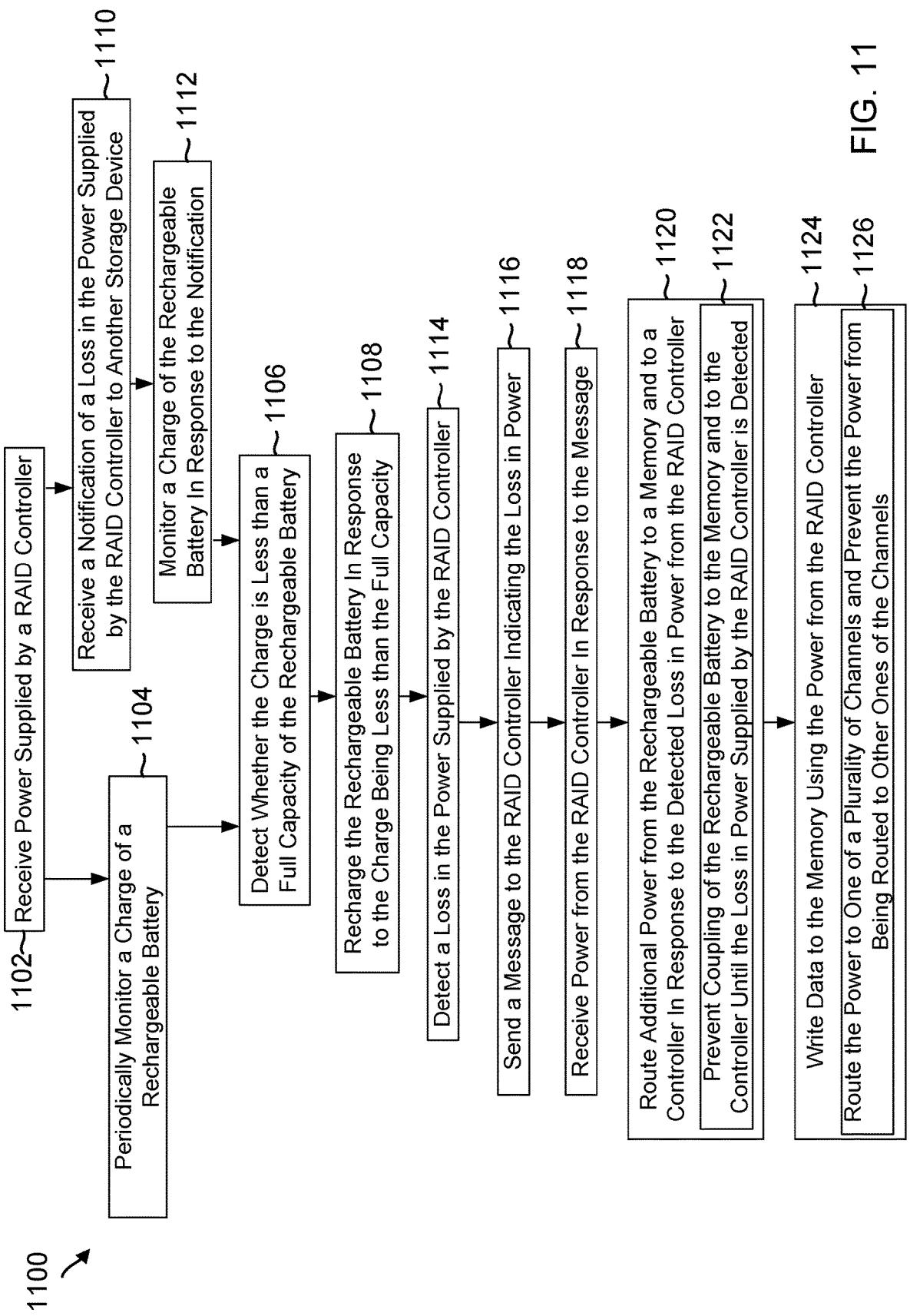
FIG. 11 is a flow chart illustrating an example of a method for power control and power loss handling in a RAID system, as performed by the storage device of FIGS. 1, 6, and 8.

FIG. 11 illustrates an example flow chart 1100 of a method for power control and power loss handling in a RAID system. For example, the method can be carried out in a storage device 102 such as the one illustrated in FIG. 1. Each of the steps in the flow chart can be controlled using the controller as described below (e.g. controller 123), by a component or module of the controller, or by some other suitable means. For instance, one or more steps in the flow chart can be controlled by a power management circuit (e.g., a PMIC) coupled to a memory and the controller (which is also coupled to the memory).

As represented by block 1102, the controller may receive power supplied by a RAID controller. For instance, referring to FIGS. 1 and 6-8, the controller 123, 608 may receive power supplied by RAID controller 806 (e.g., in host device 104, 604, 804 or separate from a host device). For instance, the power supply 704 from the RAID controller may originate from a battery (e.g., battery 616) powering the RAID controller.

In one example, as represented by block 1104, the controller may periodically monitor a charge of a rechargeable battery. The rechargeable battery may be coupled to the power management circuit. For instance, referring to FIGS. 1 and 6-8, the controller 123, 608 may periodically (e.g. daily) send a battery monitor command to power management circuit 610, 702 to monitor a charge of one or more of the rechargeable batteries 614 in battery bank 612. In response to the command, as represented by block 1106, the power management circuit may detect whether the charge is less than a full capacity of the rechargeable battery. For instance, referring to FIG. 7, the power management circuit 702 may include battery charge detector 712 (e.g., a comparator) which compares the present charge of the rechargeable batteries (represented by voltage Vin2) with a reference voltage Vrefb (representing a voltage of the batteries when charged to full capacity). Then as represented by block 1108, the power management circuit may re-charge the rechargeable battery in response to the charge being less than the full capacity. For instance, referring to FIG. 7, if Vin2<Vrefb, the battery charge detector 712 may output a recharge switch enable signal which activates battery recharge switch 714 to allow current from current source 716 to flow to the battery bank and recharge the rechargeable batteries.

In another example, as represented by block 1110, the controller may receive a notification of a loss in the power supplied by the RAID controller to another storage device, and as represented by block 1112, the controller may monitor a charge of the rechargeable battery in response to the notification. In response, the power management circuit may similarly perform the steps represented by blocks 1106 and 1108. For instance, referring to FIGS. 1 and 6-8, the controller 123, 608 in one of the storage devices 602, 808 may receive power loss notification 816 from RAID controller 806 indicating that the power management circuit 610, 702 of another one of the storage devices 602, 808 detected a loss in the supplied power (e.g., power supply 704) from the RAID controller. In response to this power loss notification 816, the controller 123, 608 may issue the battery monitor command to the power management circuit 610, 702 of the former one of the storage devices to detect and re-charge the rechargeable batteries 614 in battery bank 612 as previously described.

As represented by block 1114, the controller may cause the power management circuit to detect a loss in the power supplied by the RAID controller. For instance, referring to FIGS. 1 and 6-8, the controller may issue a power loss detect command (e.g., in response to power loss notification 816 or generally during run-time) to power management circuit 610, 702. The power management circuit may include power loss detector 708 (e.g., a comparator) which detects whether the power supply 704 from the RAID controller (represented by voltage Vin) falls below voltage reference Vref (represented by a threshold voltage indicating an imminent UGSD if Vin is reduced below this voltage within a given period of time). Then as represented by block 1116, the controller may send a message to the RAID controller indicating the loss in the power. For instance, referring to FIGS. 1 and 6-8, if power loss detector 708 detects that Vin reduced below Vref within a given period of time (e.g., 100 μs), then the result may signal a message trigger to the controller 123, 608 to provide message 814 to the RAID controller 806 indicating the power loss. Afterwards, as represented by block 1118, the controller may receive power from the RAID controller in response to the message. An amount of the power may be based on a size of data to be written to the memory. For instance, referring to FIGS. 1 and 6-8, in response to message 814, the controller 123,608 may receive from the RAID controller 806 emergency power routed from one or more rechargeable batteries in battery bank 812 (e.g., a different power source than the original power supply from battery 616). An amount of this emergency power which the RAID controller may supply may be based on an amount of the data (e.g., data 618 or control information 620) the controller 123, 608 of the storage device 602, 808 is writing to the NVM 110, 606. As an example, if the storage device 602, 808 has a programming speed of 500 MB/s and the controller has 1 GB of data to be programmed (e.g., two seconds of data), the RAID controller may optimally ration two seconds of emergency power to the controller 123, 608 to complete programming the data. For instance, the RAID controller may supply 2 W of emergency power over 2 seconds to the storage device 602, 808.

As represented by block 1120, the power management circuit may route additional power from the rechargeable battery to a memory and to the controller in response to the detected loss in power from the RAID controller. For instance, referring to FIGS. 6-8, if power loss detector 708 of storage device 602, 808 detects that Vin reduced below Vref within a given period of time (e.g., 100 µs), then in addition to (or in lieu of) signaling message 814 to the RAID controller 806 indicating the power loss, the power management circuit 610, 702 may route additional emergency power from the rechargeable batteries 614 in battery bank 612 to the NVM 110, 606 and controller 608. As an example, the rechargeable batteries 614 may be initially decoupled from the memory (e.g., NVM 110, 606) and the controller (e.g., controller 123, 608) via a switch (e.g., emergency power switch 710), and the power management circuit 702 may enable the switch to couple the rechargeable batteries to the memory and the controller after the loss in the power supplied by the RAID controller is detected by power loss detector 708. For example, if power loss detector 708 detects that Vin reduced below Vref within a given period of time (e.g., 100 µs), the output of the power loss detector may serve as a power switch enable which activates emergency power switch 710 to couple the battery bank 612 to the power supply 704 and thus allow emergency power to be supplied to the various components of the storage device 602, 808. Thus, as represented by block 1122, the power management circuit 702 may prevent coupling of the rechargeable batteries to the memory (e.g., NVM 110, 606) and to the controller (e.g., controller 123, 608) until the loss in power supplied by the RAID controller is detected (e.g., by power loss detector 708). For instance, the emergency power switch 710 may be deactivated so that emergency power may not be routed from the battery bank line to the power supply line while Vin>Vref.

As represented by block 1124, the controller may write data to the memory using the power from the RAID controller and/or the additional power from the rechargeable battery. The data may be, for example, control information or metadata. For instance, referring to FIGS. 1 and 6-8, the controller 123, 608 may write control information 620 to the NVM 110, 606 using the emergency power supplied from the RAID controller 806 (e.g., via battery bank 812) or the additional emergency power supplied from battery bank 612 in the storage device 602, 808. In one example, the power management circuit may be coupled to the memory via a plurality of channels, and as represented by block 1126, the controller may route the power or additional power to one of the channels and prevent the power or additional power from being routed to other ones of the channels. The control information or metadata may be written to the memory using the routed power or routed additional power over the one of the channels. For instance, referring to FIGS. 1 and 6-8, the power management circuit 610, 702 may be coupled to the NVM 110, 606 over multiple channels 1-N (as illustrated in the example of FIG. 7), where N is a given number of channels in the storage device 602, 808, and the controller 123, 608 may issue a channel enable signal to activate one of the channel enable switches and deactivate the other channel enable switches so that the power is routed only to the channel over which the controller is writing the control information 620.

Figure 12:
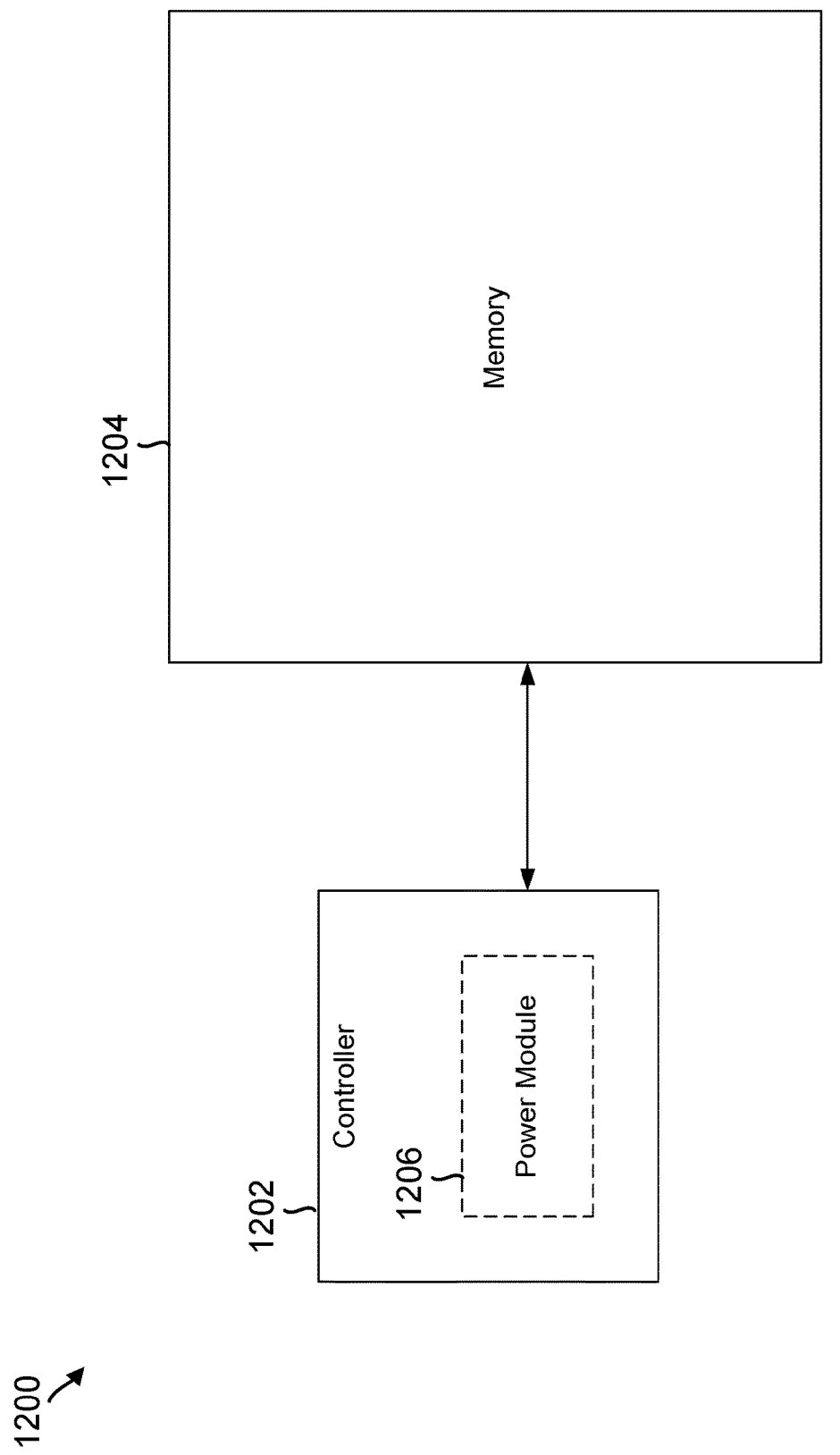
FIG. 12 is a conceptual diagram illustrating an example of a controller that performs power control and power loss handling in a RAID system in the storage device of FIGS. 1, 6, and 8.

FIG. 12 is a conceptual diagram illustrating an example 1200 of a controller 1202 coupled to a memory 1204 in a storage device. For example, controller 1202 may correspond to controller 123, 608 and memory 1204 may correspond to the NVM 110, 606 of the storage device 102, 602, 808 in FIGS. 1, 6, and 8. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

In one example, the controller 1202 includes a power module 1206 that may provide a means for receiving power supplied by a RAID controller, receiving a notification of a loss in the power supplied by the RAID controller to another storage device, detecting a charge of the rechargeable battery in response to the notification, detecting another loss in power supplied by the RAID controller, sending a message to the RAID controller indicating the loss in power, and receiving power from the RAID controller in response to the message. For example, the power module may perform the process or algorithm described above with respect to FIG. 11.

Accordingly, by implementing a rechargeable battery in the storage device of the present disclosure for addressing UGSD, the storage device provides for lower costs and smaller form factor than PLP approaches solely using capacitors. Moreover, the present disclosure provides for optimized emergency power supply with existing system components, sufficient emergency power for writing data and control information, and reliable UGSD handling. Additionally, the present disclosure allows for reliable communication between the host/RAID controller and storage device for power loss handling, and describes host/RAID controller-enabled power stability checks for all storage devices in the RAID system upon a warning or message from one of the storage devices to ensure power and host system data security. For example, if a storage device ascertains that it is losing power, the storage device may inform the host/RAID controller, which in turn not only may provide a PLN to the other storage devices but may also check or cause the other storage devices to check whether these storage devices have sufficient power to write their cached data, whether the storage devices need to recharge their batteries, or whether additional host/RAID controller-supplied power is needed.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:
1. A storage device, comprising:
a memory;
a storage device controller coupled to the memory;
a storage device power management circuit coupled to the memory and the storage device controller; and wherein the storage device power management circuit is configured to detect a loss in supplied power to the storage device, to cause the storage device controller to send a message indicating the loss in power, and to receive emergency power from a host device or a redundant array of independent disks (RAID) controller in response to the message, wherein the storage device controller is configured to determine an optimal amount of emergency power and time required to write data to the memory, and wherein the storage device controller is configured to write data to the memory using the emergency power from the host device or the RAID controller.

2. The storage device of claim 1, wherein the storage device power management circuit is further configured to ration the received emergency power from the host device or the RAID controller.

3. The storage device of claim 1, further comprising:
a rechargeable battery coupled to the storage device power management circuit, wherein the storage device power management circuit is further configured to route additional power from the rechargeable battery to the memory and to the storage device controller in response to the detected loss in the supplied power.

4. The storage device of claim 3, wherein the storage device controller is configured to periodically monitor a charge of the rechargeable battery.

5. The storage device of claim 4, wherein the storage device controller is configured to cause the storage device power management circuit to detect whether the charge is less than a full capacity of the rechargeable battery, and the storage device power management circuit is configured to re-charge the rechargeable battery in response to the charge being less than the full capacity.

6. The storage device of claim 3, wherein the storage device power management circuit is configured to prevent coupling of the rechargeable battery to the memory and to the storage device controller until the loss in the supplied power is detected.

7. The storage device of claim 6, wherein the rechargeable battery is initially decoupled from the memory and the storage device controller via a switch, and the storage device power management circuit is configured to enable the switch to couple the rechargeable battery to the memory and the storage device controller after the loss in the supplied power is detected.

8. The storage device of claim 1, wherein the data written to the memory is control information.

9. The storage device of claim 8, wherein the storage device power management circuit is coupled to the memory via a plurality of channels, the storage device power management circuit is configured to route the emergency power to one of the channels and to prevent the emergency power from being routed to other ones of the channels, and the control information is written to the memory using the routed power over the one of the channels.

10. A host device, comprising:
a memory;
a redundant array of independent disks (RAID) controller coupled to the memory;
a host power management circuit coupled to the memory and the RAID controller; and
a rechargeable battery coupled to the host power management circuit;
wherein the host power management circuit is configured to supply power from the rechargeable battery to a storage device, and the RAID controller is configured to receive a message from the storage device indicating a detected loss in the supplied power, and to supply emergency power to the storage device in response to the message, wherein the storage device controller is configured to determine an optimal amount of emergency power and time required to write data to the memory.

11. The host device of claim 10, wherein the host power management circuit is configured to detect whether a charge of the rechargeable battery is less than a full capacity of the rechargeable battery, and to re-charge the rechargeable battery in response to the charge being less than the full capacity.

12. The host device of claim 10, wherein the RAID controller is further configured to send a power loss notification to another storage device in response to the message, and the host power management circuit is configured to receive storage device emergency power from the other storage device in response to the power loss notification.

13. The host device of claim 12, wherein the RAID controller is configured to provide, in response to the power loss notification, a command to a storage device controller of the other storage device to detect whether the other storage device is experiencing a loss in supplied power from the host device.

14. The host device of claim 12, wherein the RAID controller is configured to provide, in response to the power loss notification, a command to a storage device controller of the other storage device to monitor a charge of rechargeable batteries in a battery bank of the other storage device.

15. The host device of claim 10, wherein the host power management circuit is coupled to the storage device and a plurality of other storage devices respectively via a plurality of channels, and the host power management circuit is configured to route the emergency power to one of the channels corresponding to the storage device and to prevent the emergency power from being routed to other ones of the channels corresponding to the other storage devices.

16. The host device of claim 10, wherein the message indicates a current status of the storage device, the current status including at least one of a currently written amount of data in the non-volatile memory, a time which the detected loss in the supplied power has occurred, a voltage associated with the detected loss in the supplied power, or other information indicating an anticipated ungraceful shutdown (UGSD).

17. The host device of claim 10, wherein the message indicates the RAID controller to refrain from writing additional data to the storage device from which the message is received.

18. A redundant array of independent disks (RAID) system, comprising:
a plurality of storage devices, each of the storage devices including:
a non-volatile memory;
a storage device controller coupled to the memory;
a storage device power management circuit coupled to the non-volatile memory and the storage device controller; and
a rechargeable battery coupled to the storage device power management circuit; and
a host device coupled to the storage devices, the host device including:
a memory;
a RAID controller coupled to the memory; and
a host power management circuit coupled to the memory and the RAID controller;

wherein each of the storage device controllers is configured to receive supplied power from the host power management circuit; and wherein the storage device power management circuit of one of the storage devices is configured to detect a loss in the supplied power, to cause the storage device controller of the one of the storage devices to send a message to the host device indicating the loss in power, and to receive emergency power from the host device or the RAID controller in response to the message, wherein the storage device controller is configured to determine an optimal amount of emergency power and time required to write data to the memory.

19. The RAID system of claim 18, wherein the storage device controller of another one of the storage devices is configured to receive a notification of a loss in the supplied power to the one of the storage devices, and to cause the storage device power management circuit of the other one of the storage devices to detect a charge of the rechargeable battery of the other one of the storage devices in response to the notification.

20. The RAID system of claim 18, wherein the storage device power management circuit of the one of the storage devices is further configured to ration the received emergency power from the host device or the RAID controller, and to supply storage device emergency power to the host device or the RAID controller in response to a power loss notification from the host device or the RAID controller.

* * * * *